UNITED STATES PATENT OFFICE.

FREDERICK A. WALDRON, OF PLAINFIELD, NEW JERSEY.

PROCESS FOR PRESERVING MEATS.

1,198,174.            Specification of Letters Patent.    Patented Sept. 12, 1916.

No Drawing.      Application filed September 18, 1914. Serial No. 862,382.

*To all whom it may concern:*

Be it known that I, FREDERICK ARDEN WALDRON, a citizen of the United States of America, residing in Plainfield, county of Union, State of New Jersey, have invented certain new and useful Improvements in Processes for Preserving Meats, of which the following is a specification.

My invention relates to an improved process for the preservation of animal substances, such as beef, mutton, game, fish and the like, whereby they may be maintained in good condition for a considerable period of time, and more particularly to a process for the preparation of salted and smoked fish and meats.

Heretofore all fish and meats that have required preserving or salting have been handled by extremely crude and unsanitary methods. The amount of salt and moisture, as well as the air drying is a matter of guess work, resulting in great variations in the quality of the product and the amount of the ingredients. In air drying, great difficulty is experienced in preventing the fish or meats from becoming soft and the initial permanency and flavor destroyed, when the temperature of the atmosphere exceeds eighty degrees Fahrenheit, and when artificially dried, the meats turn yellow. This point is what is known to the trade as the "cooking point."

For the sake of brevity the following description of my invention relates more particularly in its application to the salting of cod fish. The fish is dressed and cleaned and then placed in a vacuum chamber, and about sixty per cent. of the moisture contained in the fish is evacuated from it. It is then treated to a bath of finely pulverized salt, saturated solution of salt or other preservative. This preservative may or may not contain flavoring compounds. The fish is then subjected to a pressure of clean, dried air at a pressure of from forty to sixty pounds per square inch and at a temperature below eighty degrees Fahrenheit, which is about the cooking point of salted fish, for the purpose of forcing the preservative into the cells and pores, filling them completely. The "cooking point" varies with the meats to be cured. After the fish is thoroughly filled with the preservative, the air is exhausted and the fish is placed in a vacuum. This may be done in the same or separate chambers, and the moisture is then evaporated at a temperature below the "cooking point." Where it is necessary, on account of the seasons, to salt the fish in the usual manner, the troubles incident to flake or air drying and kenching are entirely eliminated by the process of drying direct in the vacuum at a temperature below the cooking point. The drying in a vacuum at a temperature below the cooking point tends to render inert or sterile all bacteria without affecting the quality of the fish or meats. After the fish have been treated by this process, it is not necessary to inclose them in air tight vessels. They are dry and bleached and without any germs. I do not limit myself to the use of any particular apparatus, but confine myself to the continuous operation through the several steps which I describe.

Having thus described my invention, the following is what I claim as new therein and desire to secure by Letters Patent.

1. A process of drying and preserving meats, consisting in placing the meats in a vacuum chamber, removing all the surplus moisture, impregnating with a preservative, by the application of pressure, again placing and keeping the substance in a vacuum until the necessary dryness is attained, with the temperature never exceeding the cooking point.

2. A process of drying or preserving fish or meats, consisting of impregnating with a preservative and evacuating the moisture from the substance in a vacuum at a temperature between the freezing and the cooking point.

This specification signed and witnessed in room 1312, 90 West street, New York, in the city of New York, this 17th day of September, A. D., 1914.

FREDERICK A. WALDRON.

In the presence of—
EDW'D VAN WINKLE,
FLORENCE MCALEER.